United States Patent [19]

Gorton

[11] Patent Number: 5,571,219
[45] Date of Patent: Nov. 5, 1996

[54] COATING COMPOSITION METHOD OF USING IT AND ARTICLE COATED WITH SAME

[75] Inventor: Anthony D. T. Gorton, Hatfield, United Kingdom

[73] Assignee: Wembley Rubber Products (M) Sdn. Bhd., Selangor, Malaysia

[21] Appl. No.: 349,962

[22] Filed: Dec. 6, 1994

[30] Foreign Application Priority Data

Aug. 11, 1994 [GB] United Kingdom .................. 9416251

[51] Int. Cl.$^6$ ............................ A41D 19/00; A61B 19/04; C09D 107/00; C09D 109/02
[52] U.S. Cl. ............................. 2/161.7; 2/168; 428/492; 428/493; 427/393.5; 525/78; 525/80; 525/84
[58] Field of Search ................................. 525/78, 80, 84, 525/233; 428/492, 493; 427/393.5; 2/161.7, 168, 164

[56] References Cited

U.S. PATENT DOCUMENTS 3,411,982 11/1968 Kavalir .
5,326,515 7/1994 Sakaki ...................................... 264/137

FOREIGN PATENT DOCUMENTS 514910 11/1992 European Pat. Off. .

Primary Examiner—David Buttner
Attorney, Agent, or Firm—Gunn, Lee & Miller, P.C.

[57] ABSTRACT

An aqueous composition comprises a natural rubber modified with a graft-polymerised methylmethacrylate polymer such as a graft-polymerised methlmethacrylate, an acrylic polymer, an acrylonitrile synthetic rubber and optionally, minor ingredients. The minor ingredients may be a quaternary ammonium surfactant and a polysiloxane. The composition is applied to an article such as of natural and/or synthetic rubber to effect coating. The process is especially suited to coating of medical gloves.

12 Claims, No Drawings

COATING COMPOSITION METHOD OF USING IT AND ARTICLE COATED WITH SAME

The present invention relates to a coating composition, to a method of applying the composition to an article and to an article coated with said composition. The composition is especially, although not exclusively, suited to application to a medical glove.

The past few years have seen a vast increase in the demand for gloves to protect the hands from possible infection when a person is dealing with someone in need. Originally, these medical gloves were confined in their usage to medical personnel such as doctors and nurses, but now they are required by many other professions such as police, teachers, firemen, first-aiders and so on. As the demand for these gloves has increased, so their service requirements have become stricter. Thus all such articles for sale in the United States of America must conform to the FDA specifications. Different regulations apply in other countries. In addition there-are further demands that are either necessary or desirable and these may be summarised as follows:

the gloves must have the required physical properties and free of physical faults, holes, embedded dirt, etc.;

many users requires a pale (white/off-white) colour;

the gloves must be compatible with the skin, i.e. non-allergenic;

their shelf-life ageing must be satisfactory;

the rubber surface should be powder-free;

the gloves should have a zero or low free protein level.

The invention in its various embodiments or examples fulfils one or more of the aforementioned requirements. It is aimed at providing superior type of medical glove with regard to its processing and/or surface finish. The term "medical glove" is used herein to define all types of medical hand protection normally known in the industry as "examination gloves", "procedure gloves", "surgeons' gloves", "post-mortem gloves", "dental care gloves" and so on. Preferably, these gloves are made totally from natural rubber or blends of polymers in which natural rubber is the predominant (>50%) polymer. As used herein, the term "rubber" means any natural or synthetic rubber or natural rubber and polymer blend unless specifically stated to the contrary.

The special needs of these gloves need to be considered further. A good white colour is easy to produce but will be lost to a greater or lesser extent on chlorination and ageing (q. v.).

Compatibility with human skin is generally a pre-requisite especially in the case where gloves are worn for long periods during extended medical procedures, and this property is sometimes termed "hypoallergenicity". This property is conventionally provided by using certain components in the rubber latex compound and in its processing. These are components which are known to be non-irritant and are also chosen to ensure that in the fabrication adequate washing or leaching is given. However, it has been found that for some medical personnel even gloves described in this way may on repeated use give rise to irritation or even dermatitis. To overcome the latter problem, it is desirable to provide a barrier that separates the rubber from the skin. Such a barrier would need to be innocuous and not affect the skin.

Shelf-life ageing is also an important factor. All natural rubber products degrade on ageing but this process is very slow if the product is properly formulated, processed and stored under the correct conditions. However, in the context of the present invention a new type of glove which will age with greater retention of properties compared with a normal product would be preferred.

The conventional method of manufacturing medical gloves is to treat the inherently sticky rubber surface with a bio-compatible powder such as starch. Without this material, the gloves could not be easily donned or removed, and finger manipulation would be severely restricted. However, the presence of powder on the surface of the glove means that in use, some of the powder is likely to be left behind in or on the patient.

There are two alternatives currently in use. The first entails treatment of either or both surfaces of the glove with an aqueous dilute solution of chlorine. This modifies the rubber surface chemically and provides a low friction surface for easy processing and use. Whilst this is a simple process, this treatment is deleterious to the physical properties of the glove. It darkens the film colour and impairs the shelf-life ageing characteristic, especially after sterilisation.

The second alternative involves processing the glove in such a way that a different polymeric film is deposited on the rubber surface to give the donning, removal and manipulative qualities that are required. Examples of this process are described in the following patent specifications, namely US-A-4,499,154, US-A-5,132,129, EP-A-0 413 467, EP-A-0 198 514 and EP-A-0 455 323.

The polymer used for such an applied film must be easy to apply and have the suitable properties, i.e. it should be flexible, adhere to the rubber surface, allow satisfactory manipulation and be non-irritant.

Recent studies of allergenicity have shown that medical rubber gloves with relatively high (500 ppm or more) Of free or extractable protein can give rise to anaphylactic shock in sensitised patients. Whilst these represent a very small proportion of people, it is plainly advisable to make gloves with as low a free protein level as possible. It is one object of the present invention to provide a medical glove wherein the free protein level, as measured using a standard test procedure, is as low as possible.

There are two commonly used methods of manufacturing medical gloves. Both methods rely on dipping suitably shaped formers into a coagulant, then into a rubber latex compound, followed by steps of drying, washing (leaching), and drying/vulcanisation and finally stripping. Further off-line processes may then be effected, for example extra drying, powdering, chlorination, etc. The two methods differ only in the way in which the dipping is performed. One method entails batch dipping, in which a batch of formers is dipped in one operation before passing onto the next stage. The other utilises chain line dipping, in which the formers attached to a continuous chain are dipped consecutively in the various coagulant and latex baths. Gloves made in accordance with the present invention can be formed according to either of these known methods. It can be carried out either on-line or off-line.

This current invention is based on the principle of treating the inner or outer surface or both surfaces of the glove with a novel polymeric system which gives unique properties in terms of good donning and doffing, good manipulation and finger sensitivity, a surface with a bonded non-irritant polymeric layer, very low or zero available protein, excellent pale colour, and better ageing shelf-life characteristics than normal products.

If required, this novel process can be combined with an existing finishing process, such as chlorination, so that one side of the glove is treated with the polymeric film and the other side is chlorinated. Of course, it is also possible to have one side powdered and the other side polymer treated.

The polymeric system that is used in this invention is a blend of water-based polymers which would not be expected to give the required properties, but has been found after extensive development work.

Thus, a first aspect of the present invention provides an aqueous coating composition comprising a natural rubber modified with a graft-polymerised methacrylate polymer, an acrylic polymer, an acrylonitrile synthetic rubber and optionally, minor ingredients.

Preferably, the graft-polymerised methylmethacrylate polymer used to modify the natural rubber is a graft-polymerised polymethylmethacrylate or a graft-polymerised polyethyl methacrylate.

Preferably, also the amount of methacrylate graft polymer modified natural rubber is from 0.1% to 10%, more preferably from 0.5% to 4.0%, and especially from 1.0% to 2.0%. The level of graft polymer is preferably nominally at about 40% though variations are possible.

Preferably, the amount of the acrylic polymer is from 0.1% to 10%, more preferably from 0.5% to 8.0%, and especially from 1.0% to 4.0%. This may be acrylic polymer latex of the type commonly used in the manufacture of emulsion paints. A wide range of such acrylic polymer emulsions are suitable, based on monomers such as vinyl acetate, methyl acrylate, or monomer blends of acrylic esters with styrene, ethylene, methacrylate ester, vinyl chloride, and the like.

Preferably, the amount of the acrylonitrile synthetic rubber is from 0.1% to 5%, more preferably from 0.5% to 3.0%, and especially from 1.0% to 2.0%. This synthetic rubber is preferably a polybutadiene acrylonitrile carboxylated latex, with, for example, from 30% to 40% acrylonitrile content.

Preferably, the amount of the polysiloxane is from 0.05% to 10%, more preferably from 0.1% to 5.0%, and especially from 1.0% to 3.0%. One preferred polysiloxane is polydimethyl siloxane of a molecular weight in the range 12000–15000, incorporated as an emulsion.

Preferably, the amount of the quaternary ammonium surfactant is from 0.05% to 5%, more preferably from 0.1% to 2.0%, and especially from 0.5% to 1.5%. Preferred quaternary ammonium surfactants include cetyltrimethylammonium bromide, or the chloride salt or a mixture thereof.

Although not essential to this invention, sometimes it has been found to give superior handling if from 0.1% to 3.0%, preferably from 0.5% to 2.0%, of a lubricant such as an aqueous dispersion of zinc stearate is added to the polymeric system given above. It may be queried that this represents a powder addition when the final gloves are regarded as "powderless"; however, it is believed that excess powder is removed from the glove surface during the drying/tumbling process and what is left dissolves in the rubber during the heat of drying so that the rubber surface is powder-free as measured using a standard method.

The percentages quoted above all represent the total solids content of the polymeric systems as normally determined.

The present invention will now be explained in more detail by way of the following description of non-limiting Examples.

A first Example relates to medical gloves made in the conventional way using a batch-line process fitted with wet stripping (high pressure water jets). The gloves from the wet stripping are charged into a glove tumbler resembling an industrial washing machine commonly known in the art and tumbled to remove excess water for ten to fifteen minutes. The excess water is drained, and the aqueous polymeric system added. The gloves are tumbled for ten to twenty minutes, and the excess mixture then drained. The gloves are then transferred to a tumble dryer and dried thirty to sixty minutes at 60° C. to 80° C. in hot air. The gloves are then ready for checking and packing.

In a second Example, chain line gloves are prepared according to the normal process. To facilitate stripping, it is normal to add some powder in this process both in the coagulant and as a post-oven and bio-absorbable starch is used here. However, in this invention the powder is calcium carbonate. The special treatment is then as follows. The gloves are charged into the tumbler and 0.5% acetic acid is added and tumbling commenced until all the powder is neutralised and washed off, about ten minutes is normally sufficient. The acid is drained and the polymeric system is added; the same procedure is followed as in the first example given above. In both these two cases, the polymeric system is the same on both sides of the gloves. However, it has been found that slight variations in the above system give improvements in the feel, donning, and handling, and so it may be preferable to use slightly different polymeric systems for the inside and the outside of the glove and this is achievable in this invention.

A third Example illustrates this principle and obviates the need for an extra off-line step and is suitable for batch and chain-line operation. Here, the normal aqueous coagulant mixture with a calcium salt such as nitrate is augmented with the polymeric system. In this case it is necessary to add 2.0% to 4.0% of a nonionic surfactant to the polymeric system to maintain colloidal stability in the coagulant and best to use the lowest levels of polydimethyl siloxane emulsion or to omit it entirely. In this example, the gloves are dipped in coagulant and latex in the normal way and after the main oven, dipped in the polymeric system, dried, and stripped dry. Here it is possible to alter the coating systems so that each side has a different finish.

As described above, it is possible to make hybrid coating systems, such that one side is polymer finished and the other side is chlorinated. This is illustrated in the fourth Example: gloves made on a batch or chain-line are dipped in the aqueous polymeric mixture as above, dried, and stripped. They are then chlorinated by the usual method and everted. The chlorinated layer is then inside the glove and the polymer surface is on the outside. Such a system does not possess all the advantages of the two-sided polymeric coating in terms of excellent colour, and the best unaged and aged tensile properties.

A fifth Example is also of the hybrid treatment and resembles the fourth example. The chain line is modified to provide on-line chlorination after the main oven and this is combined with the use of a polymeric coagulant as given in the third example. This method obviates the need for off-line processing, thus giving products ready for inspection and packing.

More specific information is given in the following cases:

Example 1

Gloves (40 kg weight) from a batch line were taken from the wet stripping stage were placed in a tumbler of capacity 800 litres, rotated for ten minutes to remove excess water, and the following polymeric mixture added.

| | |
|---|---|
| Polymethylmethacrylate graft polymer natural rubber latex with 40% of graft polymer, 50.0% total solids content | 32.0 kg |
| Acrylic polymer latex, 48% total solids content | 16.7 kg |
| Polybutadiene acrylonitrile carboxylated latex, | 15.4 kg |

| | |
|---|---|
| 52% total solids content | |
| Polydimethyl siloxane emulsion, total solids content 36% | 66.7 kg |
| Cetyl trimethylammonium bromide, total solids content 10% | 8.0 kg |
| Water, softened or deionised | 661.2 kg |

All parts are by weight of solids. The mixture was prepared prior to addition to the glove tumbler.

The gloves were tumbled with the mixture for twenty minutes and the polymeric system drained out. It may be used again for further treatment of gloves with slight topping up. The gloves were tumbled for a further ten minutes to remove excess, and dried in a rotatory drier for 30–60 minutes at 60° C. The weight increase per glove was between 0.5% and 3.0% by weight. The properties of the gloves made in this way compared with those finished conventionally from the same type of latex are shown in Tables 1–2. The advantages of the new coating system are clearly seen. The polymer-coated gloves were easy to don and doff, and gave excellent grip and sensitivity when in use. Polymer-coated gloves were tested for skin irritation and sensitivity and found satisfactory, using the method in B.S. 5736 parts 6, 8.

Example 2

Gloves (40 kg weight) from a batch line were taken from the wet stripping stage and were placed in a tumbler of capacity 800 litres, rotated for ten minutes to remove excess water, and the following polymeric mixture added:

| | |
|---|---|
| Polymethylmethacrylate graft polymer natural rubber latex with 40% of graft polymer, 50.0% total solids content | 16.10 kg |
| Acrylic polymer latex, 48% total solids content | 33.3 kg |
| Polybutadiene acrylonitrile carboxylated latex, 52% total solids content | 15.4 kg |
| Polydimethyl siloxane emulsion, total solids content 36% | 44.4 kg |
| Cetyl trimethylammonium bromide, total solids content 10% | 8.0 kg |
| Water, softened or deionised | 682.9 kg |

All parts are by weight of solids. The mixture was prepared prior to addition to the glove tumbler.

The gloves were tumbled with the mixture for twenty minutes and the polymeric system drained out. It may be used again for further treatment of gloves with slight topping up. The gloves were tumbled for a further ten minutes to remove excess, and dried in a rotatory drier for 30–60 minutes at 60° C. The weight increase per glove was between 0.5% and 3.0% by weight. The properties of the gloves made in this way were compared with those finished conventionally from the same type of latex are shown in Tables 1–2. The advantages of the new coating system are clearly seen. The polymer-coated gloves were easy to don and doff, and gave excellent grip and sensitivity when in use.

Example 3

Gloves (40 kg weight) from a batch line were taken from the wet stripping stage were placed in a tumbler of capacity 800 litres, rotated for ten minutes to remove excess water, and the following polymeric mixture added:

| | |
|---|---|
| Polymethylmethacrylate graft polymer natural rubber latex with 40% of graft polymer, 50.0% solids content | 32.0 kg |
| Acrylic polymer latex, 48% total solids content | 66.7 kg |
| Polybutadiene acrylonitrile carboxylated latex, 52% total solids content | 7.7 kg |
| Polydimethyl siloxane emulsion, total solids content 36% | 44.4 kg |
| Cetyl trimethylammonium bromide, total solids content 10% | 80.0 kg |
| Aqueous dispersion of zinc stearate, total solids content 35% | 45.7 kg |
| Water, softened or deionised | 523.5 kg |

All parts are by weight of solids. The mixture was prepared prior to addition to the glove tumbler.

The gloves were tumbled with the mixture for twenty minutes and the polymeric system drained out; it may be used again for further treatment of gloves with slight topping up. The gloves were tumbled for a further ten minutes to remove excess, and dried in a rotatory drier for 30–60 minutes at 60° C. The weight increase per glove was between 0.5% and 3.0% by weight. The properties of the gloves made in this way were compared with those finished conventionally from the same type of latex are shown in Tables 1–2. The advantages of the new coating system are clearly seen. The polymer-coated gloves were easy to don and doff, and gave excellent grip and sensitivity when in use.

Example 4

Medical gloves were made on a chain line using the conventional method with 5% calcium carbonate in the coagulant and a powder slurry after the main oven of 9% calcium carbonate to coat the outer surface of the gloves before stripping. The dry stripped gloves (40 kg) were charged into the wet tumbler and 400 litres of 0.5% acetic acid added. The gloves were agitated for 10 minutes. The acid was drained, and the gloves washed with water for 5 minutes. The water was drained and the following mixture added:

| | |
|---|---|
| Polymethylmethacrylate graft polymer natural rubber latex with 40% of graft polymer, 50.0% total solids content | 24.0 kg |
| Acrylic polymer latex, 48% solids content | 58.3 kg |
| Polybutadiene acrylonitrile carboxylated latex, 52% total solids content | 30.8 kg |
| Polydimethyl siloxane emulsion, total solids content 36% | 44.4 kg |
| Cetyl trimethylammonium bromide, total solids content 10% | 40.0 kg |
| Aqueous dispersion of zinc stearate, total solids content 35% | 2.3 kg |
| Water, softened or deionised | 600.2 kg |

The gloves were tumbled in the above polymeric mixture for 15 minutes, and then drained for 10 minutes, and dried for 60 minutes at 60° C.

The products have these characteristics:

| | |
|---|---|
| Appearance | good |
| Colour | white |
| Polymer coating | adhered |
| Feel, flexibility | excellent |
| Donnability | good |
| Doffability | good |
| Grip | excellent |

-continued

| | |
|---|---|
| Physical properties | excellent (as in Tables 1–2) |
| Ageing | excellent |
| Ageing, sterilised | excellent |

Example 5

This is a method of preparing gloves with a polymeric layer on both sides using a batch or chain line process in which, as described in Example 3 above, the coagulant is modified to contain the polymer which will form the inner layer of the glove when dipped but the outer layer in use, since eversion usually occurs on stripping. The following coagulant was prepared for an 800 litre coagulant tank:

| | |
|---|---|
| Polymethylmethacrylate graft polymer natural, rubber latex with 40% of graft polymer, 50.0% total solids content | 32.0 kg |
| Acrylic polymer latex, 48% total solids content | 66.7 kg |
| Polybutadiene acrylonitrile carboxylated latex, 52% total solids content | 15.4 kg |
| Nonionic surfactant, such as polyoxyethylene condensate of a long chain alcohol of 12 carbon atoms or more, with at least 12 molecules of ethylene oxide polymerised, total solids content 10% | 16.8 kg |
| Cetyl trimethylammonium bromide, total solids content 10% | 8.0 kg |
| Water, softened or deionised | 461.1 kg |

-continued

The above mixture was prepared and then blended with a mixture of:-

| | |
|---|---|
| Calcium nitrate hydrate | 20.0 kg |
| Water | 180.0 kg |

The normal batch or chain line dipping process was followed except that for ease of stripping at the end of the process, it was found that the last stage in the former cleaning process should be a dip into a 1.0% potassium oleate, prior to drying before coagulant dipping. After the main oven the formers were dipped into a blend of:

| | |
|---|---|
| Polymethylmethacrylate graft polymer natural rubber latex with 40% of graft polymer 50.0% total solids content | 32.0 kg |
| Acrylic polymer latex, 48% total solids content | 66.7 kg |
| Polybutadiene acrylonitrile carboxylated latex, 52% total solids content | 15.4 kg |
| Polydimethyl siloxane emulsion, total solids content 36% | 44.4 kg |
| Cetyl trimethylammonium bromide, total solids content 10% | 80.0 kg |
| Aqueous dispersion of zinc stearate, total solids content 35% | 2.3 kg |
| Water, softened or deionised | 559.2 kg |

The gloves were then dried, stripped, inspected, and packed. The properties of these gloves resemble those given above.

The gloves of Examples 1 to 3 were further exatuated in comparison with conventional gloves as described in Tables 1 and 2 hereinbelow.

TABLE 1

Properties of Conventional and Polymer Coated Gloves

| Glove Type | Unaged | | | Aged, 14 days/70° | | | Aged, 22 h/100° | | |
|---|---|---|---|---|---|---|---|---|---|
| | T.S. (MPa) | E.B. (%) | M 300% (MPa) | T.S. (MPa) | E.B. (%) | M 300% (MPa) | T.S. (MPa) | E.B. (%) | M 300% (MPa) |
| P, non-s | 32.1 | 865 | 1.52 | 31.9 (99%) | 1011 | 1.31 | 34.2 (107%) | 956 | 1.28 |
| P, s | 33.2 | 882 | 1.61 | 26.3 (79%) | 969 | 1.11 | 24.4 (74%) | 987 | 1.14 |
| C, non-s | 31.0 | 855 | 1.69 | 6.2 (20%) | 857 | 0.86 | 8.4 (27%) | 957 | 0.88 |
| C, s | 30.6 | 873 | 1.71 | 0 | 0 | 0 | 4.2 (14%) | 831 | 0.76 |
| P1, non-s | 33.2 | 888 | 1.63 | 29.8 (90%) | 917 | 1.68 | 29.0 (87%) | 915 | 1.68 |
| P1, s | 32.8 | 885 | 1.58 | 29.5 (90%) | 866 | 1.56 | 30.8 (94%) | 963 | 1.44 |
| P2, non-s | 33.7 | 885 | 1.58 | 31.8 (94%) | 942 | 1.50 | 33.1 (98%) | 905 | 1.62 |
| P2, s | 30.4 | 935 | 1.32 | 28.1 (92%) | 785 | 1.66 | 28.6 (94%) | 951 | 1.46 |
| P3, non-s | 34.7 | 883 | 1.62 | 31.5 (91%) | 988 | 1.56 | 33.2 (96%) | 862 | 1.60 |
| P3, s | 30.3 | 947 | 1.31 | 30.0 (99%) | 833 | 1.59 | 31.5 (104%) | 931 | 1.53 |

Key to abbreviations:
T.S. = tensile strength; E.B. = Elongation-at-break, M 300% = 300% modulus
Tensile testing carried out according to B.S. 903 part A2;
P. = powdered; non-s = non-sterilized; s = radiation sterilised;
C. = chlorinated;
P1 = polymer coated as in Example 1;
P2 = polymer coated as in Example 2;
P3 = polymer coated as in Example 3;

TABLE 2

| Powder and Extractable Protein Contents | | |
| --- | --- | --- |
| Glove Type | Powder Level, mg/glove | Extractable protein, ppm |
| Powdered | 218.0 | 166 |
| Chlorinated | 2.8 | 20 |
| Example 1 | 0.5 | 17 |
| Example 2 | 0.2 | 6 |
| Example 3 | 3.1 | 5 |

Powder levels were determined using the French standard method NF S90-000. Protein levels were determined using the Lowry method modified by the Rubber Research Institute of Malaysia; see J. Nat. Rubb. Res. 7 (3), 206–218 (1992).

In the light of this disclosure, modifications of the described Examples, as well as other Examples, all within the scope of the present invention as defined by the appended claims, will now become apparent to persons skilled in the art.

I claim:

1. A method of coating an article to be worn by a user, the method comprising applying to said article an aqueous coating composition comprising a natural rubber modified with a graft-polymerised methacrylate polymer, a vinyl acetate or acrylic polymer, and an acrylonitrile synthetic rubber.

2. The method according to claim 1, further comprising wet-stripping said article prior to said application of said aqueous coating composition and subsequently drying said article after said application.

3. The method according to claim 1, wherein calcium carbonate powder is used for effecting dry-stripping of said article prior to said application with said aqueous coating composition.

4. The method according to claim 1, wherein said composition is applied by dipping said article after heating of said article.

5. The method according to claim 1, wherein said article is made from a material comprising a synthetic rubber.

6. The method according to claim 5, wherein said article is a medical glove.

7. The method according to claim 6, wherein a coagulant is applied during manufacture of said glove, and said aqueous coating composition is incorporated with said coagulant.

8. The method according to claim 6, wherein said composition is applied to one side of said glove while the other side of said glove is subjected to a chlorination treatment.

9. The method according to claim 6, wherein said composition is applied to one side of said glove and a powder treatment is applied to a reverse side of said glove.

10. The method according to claim 1 wherein said article is made from a material comprising a natural rubber.

11. An article to be worn by a user coated with an aqueous coating composition comprising a natural rubber modified with a graft-polymerised methacrylate polymer, a vinyl acetate or acrylic polymer, and an acrylonitrile synthetic rubber.

12. The article according to claim 11, wherein said article is a medical glove.

* * * * *